United States Patent [19]
Garvey

[11] 3,944,059
[45] Mar. 16, 1976

[54] ENDLESS CHAIN CONVEYOR LINK
[75] Inventor: Francis J. Garvey, Newfield, N.J.
[73] Assignee: Garvey Corporation, Hammonton, N.J.
[22] Filed: Sept. 20, 1974
[21] Appl. No.: 507,742

[52] U.S. Cl. ............................ 198/189; 198/195
[51] Int. Cl.² ................................ B65G 17/00
[58] Field of Search ........... 198/195, 189, 264, 175, 198/199, 200; 74/255; 59/DIG. 1, 93

[56] References Cited
UNITED STATES PATENTS

| | | | |
|---|---|---|---|
| 2,792,928 | 5/1957 | Holz | 198/189 |
| 2,866,538 | 12/1958 | Goldberg | 198/189 |
| 2,955,700 | 10/1960 | Badger | 198/189 |
| 3,367,474 | 2/1968 | Kerr et al. | 198/264 |
| 3,669,247 | 6/1972 | Pulver | 198/195 |
| 3,825,108 | 7/1974 | Stone | 198/195 |
| 3,842,968 | 10/1974 | Owens | 198/195 |

FOREIGN PATENTS OR APPLICATIONS

| | | | |
|---|---|---|---|
| 999,590 | 11/1949 | France | 198/175 |

Primary Examiner—Robert J. Spar
Assistant Examiner—James M. Slattery

[57] ABSTRACT

Specially formed yoke links in an endless chain conveyor are provided with replaceable plastic or equivalent anti-friction pads for protection against wear on lateral curving of the operating run and on curved and straight portions of the return run, and have interchangeable top plates of different widths for accommodating a variety of wares to be conveyed.

7 Claims, 8 Drawing Figures

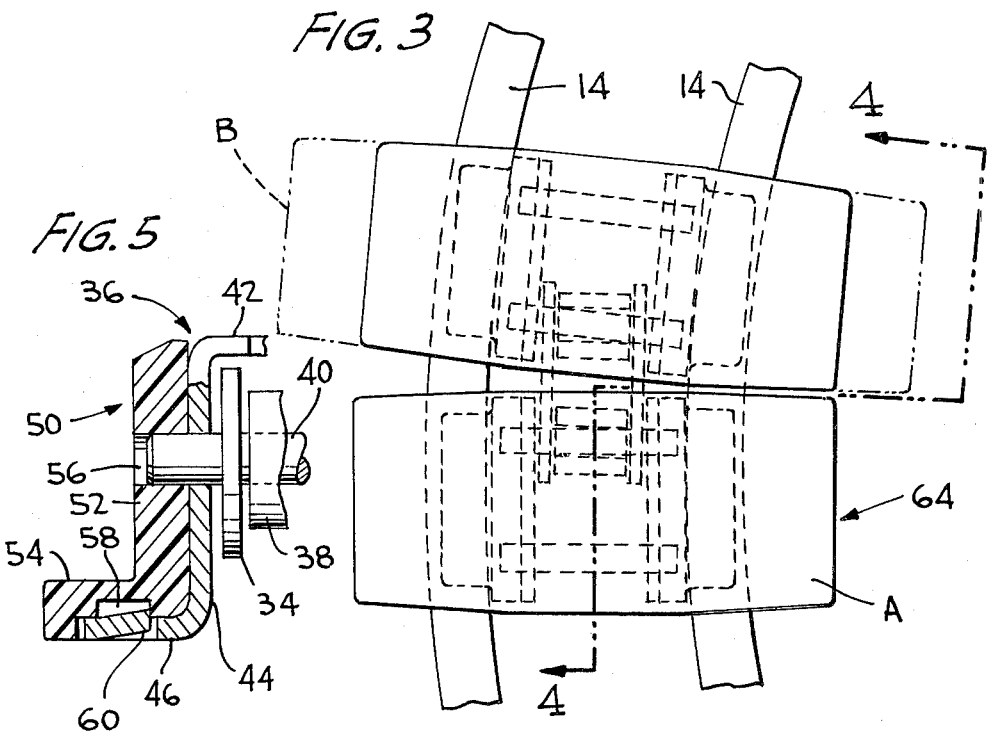
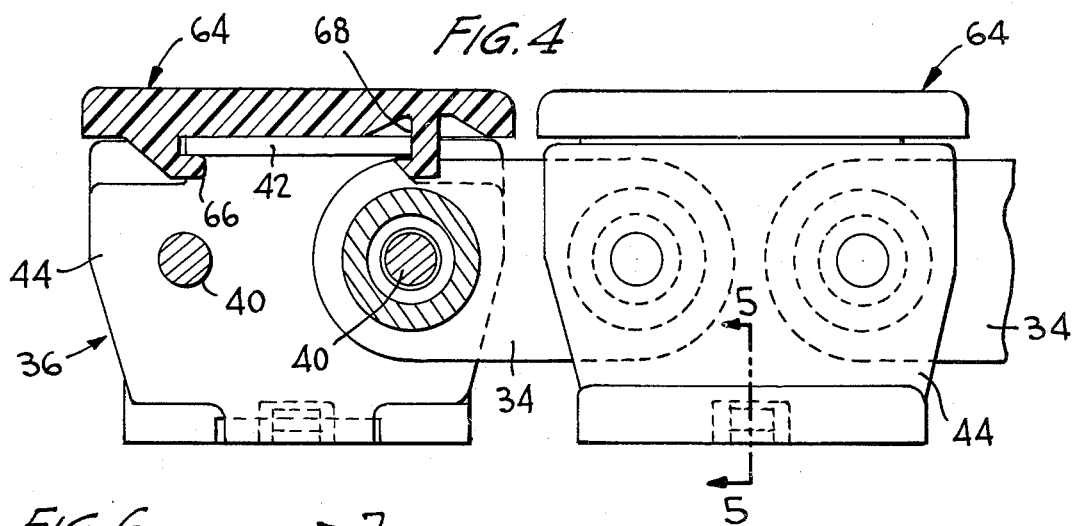
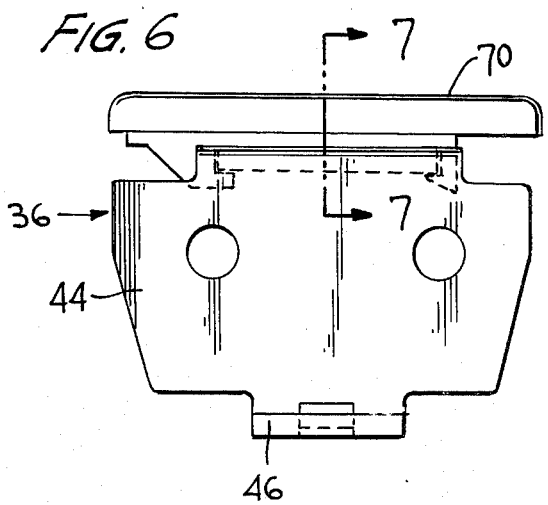
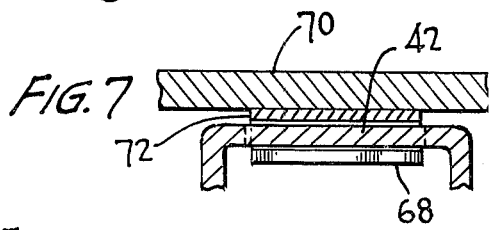
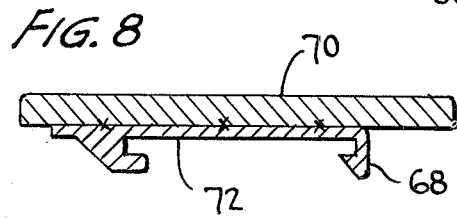

ENDLESS CHAIN CONVEYOR LINK

DESCRIPTION

Background of the Invention

Endless chain conveyors of the type widely used in moving successively a multiplicity of small wares, such as glass bottles or jars or metal cans, either in certain steps of their manufacture or in connection with their filling and sealing, incur objectionable wear in their specialized links resulting from frictional contact with the confining surfaces of the conveyor side frame structure, especially in areas of lateral curvature of the conveyor, and from similar contact with rails or the like provided in a lower part of the frame for supporting the return run of the chain.

Another difficulty with such conveyors is encountered in many installations when a change must be made in the kind of ware to be conveyed, particularly a change from smaller to larger or larger to smaller articles, such as occupy a wider or narrower space on the top plates of the links, or require change of top plate support from a single line to double or other multiple line. Alteration of the conveyor to accommodate such changes in operation generally require complete replacement of the chain in its entirety, at obviously considerable delay and expense.

The present invention aims to remedy the foregoing and other shortcomings of the conventional type of endless chain conveyor by providing simple, readily attached and removable and replaceable wear pads for protecting the permanently installed yoke links and by similarly equipping each of said links with a top plate that can be readily removed and replaced by a wider or narrower one for quickly adjusting the capacity of the conveyor to ware of different sizes or to change of placement or loading between single and multiple file. A special feature of the new construction is that all removals and replacements can be made without removing or disturbing the chain or any other component of the conveyor system.

Summary of the Invention

The foregoing and other related objectives are attained by the combination of a special yoke link, side pad and top plate. The yoke link is best made of metal, of inverted channel shape (inverted when the chain is in the operative run), with a top web for detachably mounting a top plate and with side flanges terminating in outstanding feet or tabs for hanging the chain from supporting framing rails in the return or inoperative run. The side pad, best made of plastic or equivalent antifriction material, constitutes the wear plate, and each is shaped to fit a flange and adjacent foot at one side of a yoke link. The top plate is provided in varying widths and of a selection of materials, e.g., metal, plastic or composition. The top web of each yoke link, and its side flanges and their feet or tabs, cooperate with each top plate and with each wear pad, and with special interfitting parts thereof, for snap-on mounting of the pads on the link flanges and feet and of the top plate on the link web. The pads are readily replaceable by new pads when sufficiently worn, and the top plates are just as readily interchanged with others of different size or shape whenever required, and all the foregoing changes are made without removal of the chain or disassembly of any part of the conveyor system.

Short Description of the Drawings

In the accompanying drawings, which illustrate certain embodiments of the invention which have been reduced to practice and found to give satisfactory results, and hence are at present preferred:

FIG. 3 is a top plan view of a laterally curved portion, taken on the line 3—3 of FIG. 1, showing installation of top plates of different sizes on identical yoke links;

FIG. 4 is a vertical longitudinal sectional view taken on the line 4—4 of FIG. 3;

FIG. 5 is a detail sectional view taken on the line 5—5 of FIG. 4;

FIG. 6 is a side elevational view of a yoke link embodying the invention in one preferred form;

FIG. 7 is a detail sectional view taken on the line 7—7 of FIG. 6; and

FIG. 8 is a similar detail sectional view of the yoke link of FIGS. 6 and 7 taken at a right angle to the FIG. 7 section.

Description of the Preferred Embodiments

Figure 1:
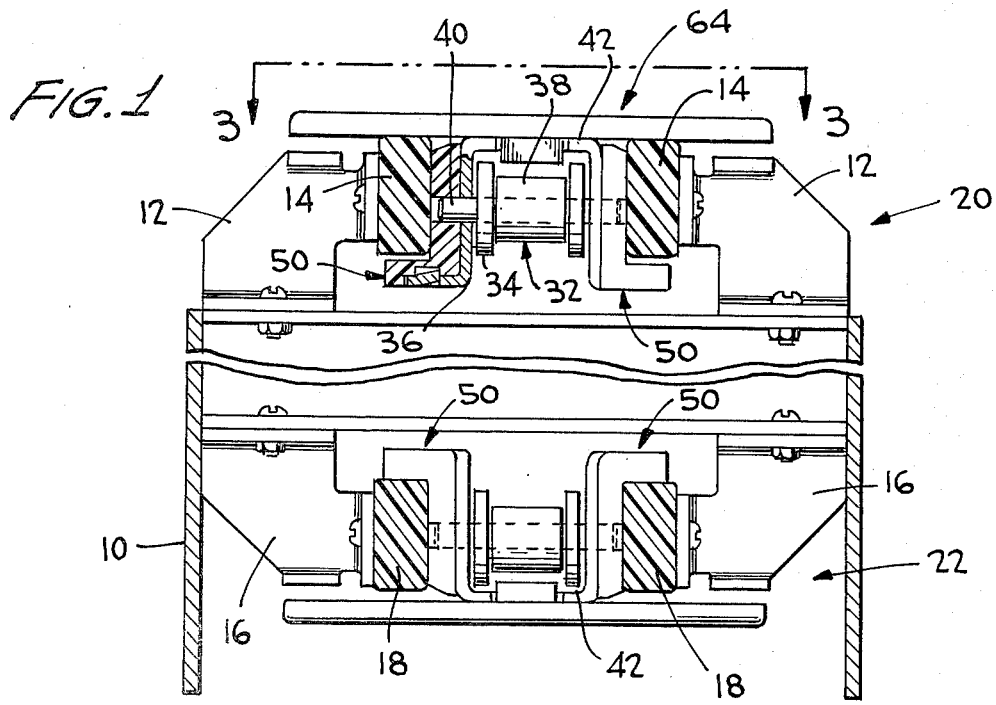
FIG. 1 is a vertical transverse sectional view taken through the forward and return runs of a laterally curved portion of a conveyor embodying the present invention.

In the drawings the reference numeral 10 designates generally the fixed supporting frame of an endless chain conveyor system, or of a laterally curved module thereof, while 11 designates the frame of a straight module of the system. Conventional brackets 12 in the upper zone of the frame mount rails 14 in at least the laterally curved portions shown in FIG. 1 of the system, and similar brackets 16 and rails 18 are provided in the lower zone of the system in at least such laterally curved portions. The operative run 20, and the return or inoperative run 22, are supported by the frame, the operative run by narrow flat wear strips 24 in straight sections of the system as shown in FIG. 2, and by the rails 14 in laterally curved sections as shown in FIGS. 1 and 3, and the inoperative, return run by the rails 18 in the curved sections and by the wide wear strips 26 in the straight sections, both kinds of strips 24 and 26 being mounted on cross members 28, 30, respectively, of the frame.

The chain, designated generally 32, comprises two kinds of links; conventional short flat plate elements 34 formed with bearing holes in their end portions, and the special yoke links 36 provided by the present invention. These yoke links are interposed in the chain, between successive pairs of the flat plate links arranged in side by side relation, held laterally spaced by bushings 38 on short pintles 40.

The yoke links are all identical. Each is made of metal, such as steel or stainless steel, and is generally channel shaped, the channel being inverted in the operative run of the chain, as shown in FIG. 4 and the upper portions of FIGS. 1 and 2. Each yoke link has a web 42 which may be considered to be a top web inasmuch as it is at the top of the link when the chain is in the operative run 20. The yoke link has also a pair of identical side walls 44, of which is a flange each depending right-angularly from a side edge of the top web, and an outstanding right-angular tab or foot 46 extending oppositely from the bottom, free or distal end of each side wall. Each side wall is formed with spaced holes spaced apart the same distance as the pintle holes of the flat links 34.

Figure 2:
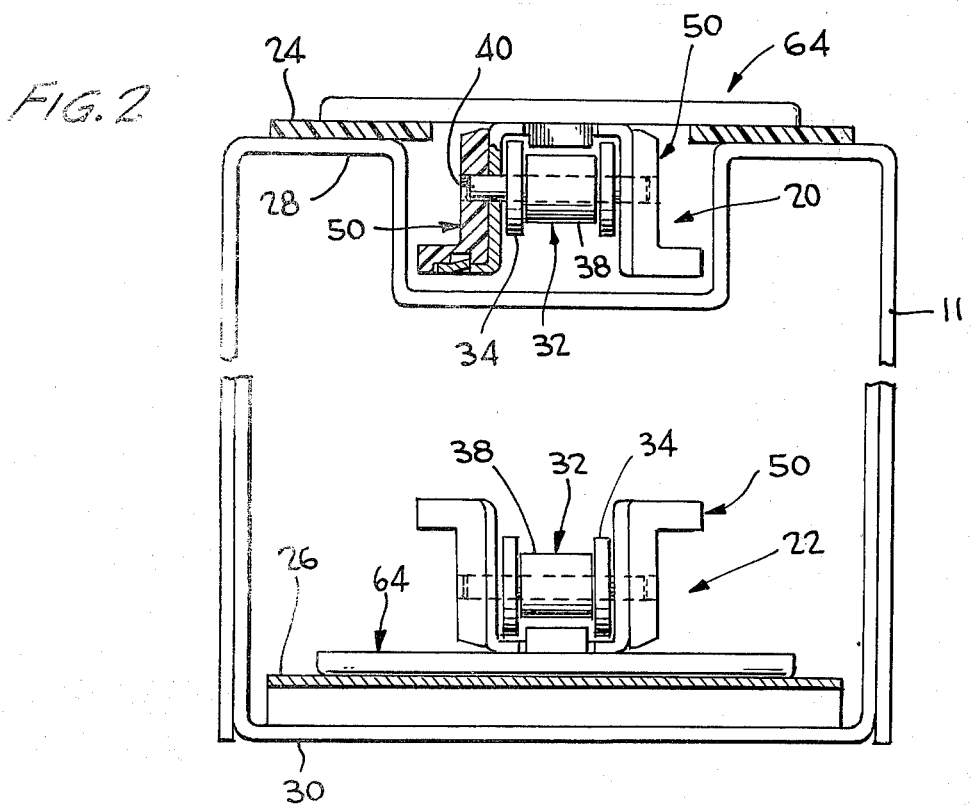
FIG. 2 is a similar sectional view taken through a straight portion of the conveyor.

The link elements 34 and 36 are assembled to form an endless chain, as shown in FIGS. 1, 2 and 4, with adjacent ends of two yoke links 36 connected by a pair of flat links 34 held in laterally spaced parallel relation by intervening bushings 38 penetrated by pintles 40, each of which extends through the aligned holes in the two links 34 and the two side walls of a link 36, with the pintle projecting somewhat beyond the outer surface of the yoke link side wall, as best appears in FIG. 5. Thus each yoke link 36 has connected to its opposite ends four links 34, two at each end, and each pair of links 34 is connected to two yoke links 36, one to each pintle 40 journaled in the aligned holes at one end of each of the two links 34. The combination thus comprises an endless chain which is mounted in the supporting framework and is driven by sprocket or other conventional means (not shown) to provide a basic conveyor chain component having operative and return runs as shown in FIGS. 1 and 2.

The wear pads provided by the invention are designated generally 50. Each consists of a substantially L-shaped body of suitable plastic or equivalent antifriction material as hereinafter explained, sized and proportioned to fit snugly against the outer surfaces of the side wall 44 and the foot or tab 46 at each side of one of the yoke links 36. Thus each pad has an upstanding larger portion 52 and a smaller outstanding lower portion 54. To mount two of these pads on each yoke link 36, one on each side of the link, the upstanding portion 52 of each pad is formed with two spaced holes 56, each of which receives the projecting end of one of the pintles 40 which connect the yoke links 36 and the flat links 34. The outstanding lower portions 54 are socketed in their under surfaces, as shown at 58, for snapping over and receiving a slightly upturned lip or tab 60 which is struck up from each foot 46 of the yoke link, all as best shown in FIG. 5.

This arrangement permits the wear pad 50 to be securely mounted in snug engagement with the side wall 44 and the associated foot 46 at one side of a yoke link 36 by fitting the projecting end of the pintle 40 into the pad hole 56 and snapping the foot socket 58 over the tab 60 as the pad is pushed to its limit against the yoke link. As will be noted from the showing in FIG. 5, the pintle prevents rise of the lower portion of the pad from the foot of the yoke link, and the interfit of the tab 60 and socket 58 prevents lateral separation of the pad from the yoke link side wall 44. As will be pointed out hereinafter, the material of which the pad is formed is a plastic or the like having adequate elasticity and resilience to permit ready application to operative position by easy pushing force and to enable the pad to be as readily removed by bending the lower portion 54 upwardly to free the link tab 60 from the pad socket 58.

The invention contemplates mounting on each of the yoke links 36 a top plate which provides the supporting surface for the articles that are to be conveyed, and making these top plates demountable for ready replacement by other top plates of different lateral dimension, i.e., plates that are wider or narrower.

For this purpose the web 42 at the top of each yoke link 36 has each of its forward and rear, or leading and trailing, edges provided with a notch of substantial length indented from the adjacent side walls 44 of the link. Top plates, designated generally 64 in FIGS. 1, 2, 3 and 4, are appropriately sized and proportioned for fitting on the webs 42 with sufficient spacing between adjacent plates for negotiating lateral turns while forming no inter-plate openings of objectionable width, and for extending laterally as far as may be necessary for any given ware conveying operation that the installation may be required to handle.

The top plate 64, shown in FIGS. 1, 2, 3 and 4, is an integral molded body of suitable plastic or the like, of substantially oblong shape, of greater width (transverse of the chain length) than length (longitudinally of the chain), the length being determined by the longitudinal spacing of the yoke links on the chain and the necessity for clearance in making lateral curves in the operation of the chain, and the width being selected in accordance with the special requirements of the articles to be conveyed.

The top plate is secured in place on the yoke link by two longitudinally spaced elongated hooks 66, 68 integrally molded on the under side of the plate, with the lips of the hooks oppositely inwardly directed to fit snugly into the notched edges of the top web 42 of the link and underlie said edges when the hooks are snapped over the web edges. The hook lips thus prevent lifting of the top plate from the web, as well as movement longitudinally relative to the yoke link, and the snug interfit of the elongated hooks into the notches prevents lateral movement of the link. The inherent flexibility and resilience of the plastic or the equivalent renders the snapping operation simple and easy, and to facilitate disengagement of the hooks for removal of the top plate, one of the hooks, e.g., the hook 68, may be formed with a lengthened stem provided by a surrounding indentation in the plate. Thus the hook 68 is readily flexed into disengagement from the link web by camming action of its inclined front face after the hook 66 is fully seated under the opposite edge of the web.

As heretofore stated, the easy removability and replacement of the top plates makes possible the provision of sets of plates of different sizes, i.e., different widths for accommodating different requirements of the articles to be conveyed. FIG. 3 illustrates two such top plates, a narrower one designated A and a larger one designated B. Differences in top plate details and design other than dimensions may be provided in the several sets, as by incorporating surface embossments, recesses, etc., for better receiving and holding spaced articles, as will be understood.

The top plate 64 of FIGS. 1, 2, 3 and 4 is molded of plastic and the hooks 66, 68 are integral elements of the molded body.

Other specifically different top plates are contemplated, such as the form shown in FIGS. 6 7 and 8. There the plate 70 is metallic, i.e., steel or stainless steel, and has spot welded or otherwise secured to its under surface a hooked attachment 72 which adapts the plate for mounting on the yoke link in the same manner as the all-plastic plate. It will be understood that, even though the metal plate 70 is quite rigid, the relatively thin metal of the attachment is sufficiently flexible to permit the cam-faced hook shown at the right in FIG. 8 to snap into securing position over the yoke link edge and to be flexed into releasing position in the same manner as the plastic hook 68 of the other illustrated top plate.

The plastic material of which the wear pads 50 are preferably made may be any of a considerable number of well known substances, such as high density polyethylene, nylon, phenolic condensation products and may include a dry lubricant, such as graphite, or have incorporated a wet lubricant, i.e., be oilimpregnated such as oilite bearing material. It is possible also to make use of powdered metal sintered with a lubricant, e.g., graphite, molybdenum disulphide or the like. All such materials, having acceptable anti-friction properties and adequate flexibility and resilience for the slight distortion required for snapping into and out of position of the pads, are to be regarded as the full equivalent of the chemical compound plastics usually regarded as comprising the total comprehension of the term "plastics", i.e., polyethylene, polystyrene, nylon, phenolic condensation products, etc., and hence all such materials are to be considered within the scope of those of the appended claims which recite plastic as the material of the wear pads.

It will be recognized that wear pads and top plates formed and secured in position in accordance with the principles of the invention hereinabove explained can be readily installed, removed and replaced by unskilled labor without requiring any removal of the chain itself or any element thereof. This is deemed to be an important advantage of the new construction.

Changes in details of the embodiments selected to illustrate the invention in the foregoing specification and the accompanying drawings may be made within the spirit of the invention as broadly defined by the appended claims.

I claim:

1. A plate top conveyor chain apparatus having an upper operative run and a lower return run comprising
    an endless chain having a plurality of yoke links forming operative components thereof,
    each of said yoke links being of inverted channel shape, having a web portion adapted to support a plate top mounted thereon,
    side flanges right-angularly extending from the side edges of said web portion,
    and a pair of feet right-angularly oppositely outwardly extending from the distal ends of the side flanges,
    unitary one-piece wear pads formed of anti-friction material each having two right-angularly related portions comprising a first portion engaged with the outer surface of a yoke link side flange for contact with the vertical surface of a guide rail to constrain lateral movement of the chain in the operative run of the apparatus and a second portion engaged with the upper surface of the yoke link foot for contact with the horizontal surface of a rail providing vertical support for the chain in the return run of the apparatus,
    and means removably securing two of said wear pads in said engagement with each of said yoke links.

2. A plate top conveyor chain apparatus comprising
    an endless chain having a plurality of yoke links forming operative components thereof,
    each of said yoke links being of inverted channel shape, having a web portion adapted to support a plate top mounted thereon.
    side flanges right-angularly extending from the side edges of said web portion,
    and a pair of feet right-angularly oppositely outwardly extending from the distal ends of the side flanges,
    a wear pad having right-angularly related portions engaged respectively with the outer surface of each yoke link side flange and the adjacent surface of its foot,
    and means removably securing said wear pads to said yoke links, said means comprising
    interfitting pin and socket means on the yoke link side flanges and the portions of the wear pads engaged therewith preventing rise of the pads from the yoke links, in combination with tabs upstanding from the feet of the yoke links and penetrating sockets in the portions of the wear pads engaged therewith preventing movement of the wear pads outwardly from the yoke links.

3. A plate top conveyor chain apparatus as claimed in claim 1, in which the yoke links are metallic and the wear pads are plastic.

4. A plate top conveyor chain apparatus as claimed in claim 1, in which the yoke links are metallic and each yoke link has a metallic plate top removably secured to the outer surface of its web portion.

5. A plate top conveyor chain apparatus as claimed in claim 1, in which the yoke links are metallic and each yoke link has a plastic plate top removably mounted on the outer surface of its web portion.

6. A plate top conveyor chain apparatus as claimed in claim 1, in which the yoke links are metallic,
    in combination with plastic plate tops, each having spaced hook projections depending from its under surface and engaged in snap-on relation with the edges of the web portion of one of the yoke links which are normal to the side edges thereof,
    whereby the plate tops are removably and interchangeably mounted on the yoke links.

7. A plate top conveyor chain apparatus comprising
    an endless chain having a plurality of yoke links forming operative components thereof,
    each of said yoke links being of inverted channel shape, having a web portion adapted to support a plate top mounted thereon,
    side flanges right-angularly extending from the side edges of said web portion, and a pair of feet right-angularly oppositely outwardly extending from the distal ends of the side flanges,
    a plurality of removable and replaceable wear pad units formed of flexible resilient plastic, each having two right-angularly related portions, comprising a first portion engaged with the outer surface of a yoke link side flange and a second portion engaged with the upper surface of the adjacent foot of said link,
    and means mounting said wear pad unit on said link,
    said mounting means comprising a tab upstanding from a foot of the link and penetrating a socket in the under surface of said second portion of the unit so as to prevent movement of the unit outwardly from the link,
    and said mounting means including also a second separation preventing means comprising means holding said first portion of the unit against rise on the link,
    whereby said wear pad unit is mountable by snapping its socket over the adjacent link foot tab and is removable by deforming the second portion of the unit to lift the socket in said portion free of the tab for movement of the unit outwardly from the link without rise of said first portion of the unit on the link.

* * * * *